United States Patent [19]
Jonsson et al.

[11] Patent Number: 4,731,817
[45] Date of Patent: Mar. 15, 1988

[54] MULTI-PROCESSING STORED PROGRAM CONTROLLED TELECOMMUNICATION ESTABLISHMENT

[75] Inventors: Björn E. R. Jonsson, Järfälla; Oleg Avsan, Huddinge, both of Sweden

[73] Assignee: Telefonaktiebolget LM Ericsson, Stockholm, Sweden

[21] Appl. No.: 734,965
[22] PCT Filed: Sep. 18, 1984
[86] PCT No.: PCT/SE84/00301
  § 371 Date: May 14, 1985
  § 102(e) Date: May 14, 1985
[87] PCT Pub. No.: WO85/01598
  PCT Pub. Date: Apr. 11, 1985

[30] Foreign Application Priority Data
Sep. 30, 1983 [SE] Sweden .................................. 8305364

[51] Int. Cl.⁴ ............................................. H04M 3/00
[52] U.S. Cl. ..................................... 379/112; 379/269
[58] Field of Search ................... 370/58, 67; 379/112, 379/269, 284

[56] References Cited
U.S. PATENT DOCUMENTS
4,256,926 3/1981 Pitroda et al. ...................... 379/269

Primary Examiner—Stafford D. Schreyer
Attorney, Agent, or Firm—Roberts, Spiecens & Cohen

[57] ABSTRACT

In a stored program controlled telecommunication establishment, function blocks (2) of the establishment are controlled in co-operation with a computer system including a plurality of processors (1, 4). Determining the order in which the establishment control functions are preformed is included in the co-operative functions. One of the processors is separated for exclusively controlling an independent stored program controlled signal switching system (3) which performs said co-operative functions by switching co-operative signals between the function blocks (2) of the establishment and at least one central processor. The signal switching system processor (4) controls a co-operative instruction memory (8), co-operative function blocks (9, 10, 12, 13) for buffering the co-operative signals, and priority determining function blocks (11, 15) for determining the consecutive order in which incoming signals are switched and for associating priority levels with signals addressed to central processors. An establishment with a flexible control load is obtained with the aid of supervision of the signal quantity fed to the central processors. The signal switching system (3) performs, with the aid of a function block (16), for flexible control load distribution, a redistribution of control load, and/or reduces signal switching to a central processor if the latter is overloaded.

6 Claims, 1 Drawing Figure

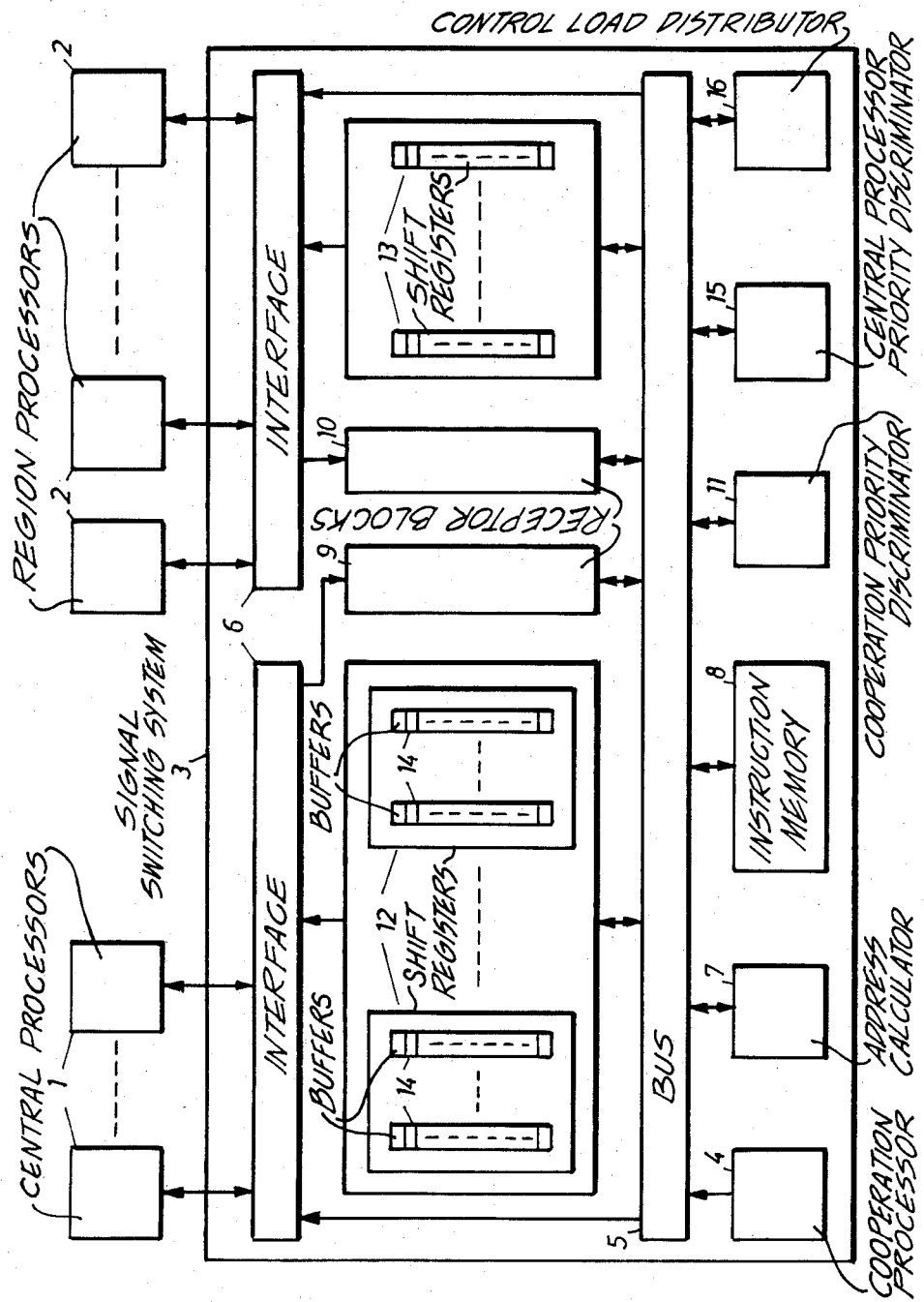

MULTI-PROCESSING STORED PROGRAM CONTROLLED TELECOMMUNICATION ESTABLISHMENT

FIELD OF INVENTION

The present invention relates to a stored program controlled telecommunication establishment, the controlled and controlling parts of which comprise a plurality of establishment function blocks, which perform telephony functions and computer functions with the aid of instruction memory units and data memory units for storing establishment control information, and a plurality of processors which include at least one central processor, said function blocks and processors controlling in real time and in mutual co-operation the telephony traffic processed by the establishment with the aid of the stored control information, the co-operation functions containing determination of the consecutive order in which the establishment functional blocks perform their assigned functions.

BACKGROUND

A stored program controlled telecommunication establishment includes mutually co-acting telecommunication means for providing teleconnections, and a computer system for controlling the telephony traffic clearing process. As foundation stones the computer system includes an instruction memory and data memory for storing the necessary control information for controlling the telecommunication means and the computer system, as well as one or more processors controlling the execution of the control functions of the entire establishment in real time.

It was seen already during the sixties that many conventional telecommunication means can be implemented by a computer. According to state-of-the-art stored program controlling technique, function blocks are arranged which carry out assigned telecommunication functions and computer functions, their function execution being controlled by one or more processors. Real-time control requires, independent of the number of processors, function blocks for job-buffering and for job-priority, which determinate the consecutive order in which other function blocks carry out their assigned functions as efficiently as possible.

In the arrangement of a plurality of processors, processor load distribution is obtained with the aid of so-called "preprocessing" and "multiprocessing".

By preprocessing is meant that given regional control functions are carried out with the aid of regional processors and regional memories arranged in the associated function block, a central processor commanding the execution of the functions and receiving their result. The regional processors and central processor each control their given function clearings. A computer system with a constant distribution of control load and with the possibility of execution overlapping is obtained, but in principle a regional processor system is still a one-processor system, where the central processor controls function blocks provided with regional processors and where co-operation between the function blocks and the central processor requires well-defined interprocessor co-operation controlled by the central processor.

In multiprocessing at least two central processors are arranged, these together having access to the data memory of the establishment, and there is obtained a number of possibilities for computer configurations and control load distributions existing during operational periods. A processor redundancy is used that enables, without rigorous reconfiguration of the computer system, variation in real time of the rules according to which the control load is distributed to the central processors. The tasks of the processors are thus adjusted dynamically and optimally to the instantaneous telephony traffic clearing process.

It is known to combine preprocessing with multiprocessing and also to introduce regional processor redundancy.

The above mentioned advantages, i.e. function execution carried out in parallel due to constant or flexible processor load distribution, are obtained at the cost of the disadvantage that it is absolutely necessary to have interprocessor communication and processor co-operative functions, which constitute an extra computer load and which must be graded as inefficient in relation to the efficient telephony traffic clearing functions. Due to the above-mentioned deficiencies in principle between preprocessing and multiprocessing there is the result that a regional processor only co-operates with its central processor and that a central processor controls its regional processors and also co-operates with the other central processors. The two-way co-operation between a central processor and its associated function blocks with or without regional processors is controlled by this central processor, which also one-way controls the execution of functions for its co-operation with the other central processors. Control of the processors' co-operation has so far been decentralized. Each processor has processed instructions for its co-operation with the other processors.

The known art concerning function blocks, interprocessor communication, preprocessing and multiprocessing is described, e.g. in U.S. Pat. Nos. 3,503,048, 3,969,701 and in the journal "Electronics", Jan. 27, 1983, pages 94–97 in an article "Fault-tolerant Computers" by Kenneth I. Cohen.

SUMMARY OF THE INVENTION

The present invention is directed to a computer system with at least two processors for controlling a telephony traffic clearing process in real time. The inventive concept is to introduce a constant distribution of the total system processor load such that one of the processors, hereinafter called co-operation processor, controls the above-described indispensable establishment function block co-operation and interprocessor co-operation. The co-operation processor only has access to a co-operation memory for storing co-operative control information. The co-operation processor achieves co-operation by switching co-operative signals, and in the co-operation there is included deciding with the aid of job priority function blocks the consecutive order in which the establishment function blocks are ordered to execute assigned functions.

There is thus obtained as the inventive concept the introduction into the total stored program controlled telecommunication establishment a stored program controlled co-operative signal switching system which is independent per se, and which includes the co-operation processor connected to a plurality of co-operation function blocks and priority determining function blocks. The function blocks of the signal switching system are realized substantially with the aid of the co-operation memory. If the total telecommunication establishment for switching calls between telephone subscribers is compared with the inventive administrative signal switching system, it will be found that the establishment function blocks, regional processors and central processors function as subscribers to the signal switching system, subscribers calling each other according to given rules and conferring with one another according to given signaling codes.

The main subject of the invention is not principally to change the conventional, indispensable co-operation process, but the proposed centralized real time control of the co-operation process with the aid of an independent stored program controlled system often enables simplified rules of co-operation. For example, it is possible to inhibit the above-mentioned conventional rule that a regional processor only co-operates with its central processor. The co-operative signal switching system is also used to switch a signal directly between two of the regional processors. A new form of co-operation is also enabled, which (similar to known conference call technique) includes signal switching from one to at least two of the establishment function blocks, central processors and/or regional processors. Even without such simplifications there is achieved that the introductorily mentioned inefficient computer loading practically ceases to affect the establishment capacity telephony traffic clearance, due to the administrative co-operation process separated with the aid of the co-operation processor.

In an establishment where the establishment function blocks controlled by a plurality of central processors each include a regional processor as well as a regional memory unit storing instructions and data, the independent stored program controlled co-operative signal switching system is solely connected to the central processors and regional processors. As a further advantage with the invention there is then obtained that the establishment processors, without deteriorating the real time controlling ability of the entire computer system, may have different standards with regard to coding, data word length, instruction format etc (so that metaphorically speaking the processors do not understand each other), if the co-operative signal switching system is provided with functional units for the necessary signal conversion. This further advantage makes itself particularly felt if flexible load distribution is to be used between a plurality of central processors of different standards. The centrally controlled co-operation process enables variation of the load distribution. With the aid of function blocks for flexible load distribution controlled by the co-operation processor, upon faults in the establishment, reconfigurations in the computer system are achieved which prevent telephony traffic breakdowns as far as possible, and job assignment rules are achieved which are adjusted to the heavy traffic clearing conditions, without disturbing the traffic in progress. If the computer system includes a plurality of central processors with processor redundancy, the job assignment is adjusted to the traffic clearance by a multiprocessing reorganization carried out in steps. Even if the system lacks processor redundancy, for example when it is controlled by a single central processor, the co-operative signal switching system may control the job assignment in real time by measuring how many jobs of the same priority level must be executed. For upon a too large load within one priority level, the function block for flexible load distribution cuts out such calls resulting in jobs within the overloaded priority level.

BRIEF DESCRIPTION OF THE FIGURE OF THE DRAWING

The invention will now be described in detail with reference to the sole FIGURE of the accompanying drawing, illustrating a computer system in which the central and regional processors 1 and 2 are connected to an independent stored program controlled co-operative signal switching system 3, which includes as main parts a co-operation processor 4 and memories 8–16 oriented in co-operation function blocks for storing co-operative signals and co-operative control information.

DETAILED DESCRIPTION OF A BEST MODE FOR CARRYING OUT THE INVENTION

As parts of a computer system for controlling, in a manner known per se, a telecommunication establishment, the drawing illustrates processors which include a first plurality of central processors 1 and a second plurality of regional processors 2. The number of regional processors, each included in an establishment function block, for preprocessing establishment functions is greater than the number of central processors controlling the establishment by multiprocessing technique. The establishment processors co-operate with each other while using an independent stored program controlled co-operative signal switching system 3.

The co-operation process includes calls by the processors between themselves and transferring the messages from calling to called establishment processors. A general pre-requisite for satisfactory interprocessor communication is that the called processor must understand a switched co-operative signal. As will be described hereinafter, co-operative signals coming from the establishment processors are arranged in degrees of priority and the co-operative signal switching system performs a determination of switching priority, with the aid of which the telecommunication traffic of the total establishment is optimally executed. Interprocessor communication with the aid of a co-operative signal switching system therefore presupposes that the co-operation function blocks of the switching system also understand incoming messages. If the establishment processors have different standards, it is the responsibility of the co-operative signal switching system to adjust incoming signals to its own standard and outgoing signals to the standard of the called processor. If the establishment processors, with the aid of a function block arranged in the co-operative system, are assigned to categories, the category association being mainly affected by the pertinent multiprocessor organization, this function block controls the extent of the signal switching. For example, each of the regional processors is given permission only to call its central processor, and a central processor is allowed to call other central processors and its associated regional processors. It is possible entirely to prevent the calls of the regional processors between themselves, but the category association can also decide that the regional processors assigned to the same central procesor may call each other. There is thus obtained that the total capacity of the computer system to process establishment data is dependent on the capacity of the co-operative system to process co-operative signals. The interprocessor signalling system used for the co-operative process is furthermore dependent on the sophistication of the establishment processors. The co-operative system is dimensioned so that the reception, processing and transmission of the signals takes place without congestion as far as possible. The scope of the present invention is not concerned with determining principles for listing, coding and determining priority of the co-operative signals, or generally determining the stored program controlling principles of the co-operative signal switching system.

The independent co-operative signal switching system is controlled by a co-operation processor 4 with the aid of a bus 5 which conventionally includes lines for transfers of timing pulses, orders and data to the function blocks of the co-operative system, these blocks including interface blocks 6 connected to the establishment processors for transferring co-operative signals to and from co-operative system. Interface rules are, for example, that the transfer direction from the co-operative system to the regional processors dominates the reverse transfer direction, and that the central processors themselves collect signals buffered in the co-operative system.

According to the drawing, the co-operative signal switching system is a one-processor system provided with an address calculating unit 7 and a co-operation instruction memory 8 which stores instructions for receiving, processing and transmitting co-operative signals. However, multiprocessor co-operative systems with their own preprocessing and multiprocessing techniques are conceivable.

Co-operative signals coming from the establishment processors are transferred via associated interface blocks and are stored intermediately in reception blocks 9 and 10. As required, i.e. if the establishment processors have different standards, the incoming signals are converted with the aid of tables to unitarily formed co-operative signals related to the telephony traffic clearance functions that selected establishment processors shall execute or have executed. An establishment processor clears an establishment function with the aid of a sequence of establishment instructions. If an establishment function is to be executed, the appropriate co-operative control signal contains the starting address of the associated instruction sequence. If the establishment processor has executed a function, the signal contains a result report.

The priority determining process controlled by the co-operative system for the entire telecommunication establishment includes processing, in optimum consecutive order with the aid of a functional block 11 for determining co-operation priority, co-operative signals intermediately stored in the reception blocks. Conceivable co-operation priority rules are scanning the content of the reception block 9 for signals coming from the central processors before the content of signals from the regional processors in the reception block 10, and processing result report-containing signals intermediately stored in the reception block 10 before signals containing sequence starting addresses. However, given signals which are sent from establishment function blocks for supervision and maintenance usually have the highest priority. The scope of the present invention is not concerned with determining tables for priority rules which are stored in said function blocks for determining co-operation priority.

Co-operative signals directed from the co-operative signal switching system to the establishment processors are transferred via job buffer blocks, including first in-first out shift register columns 12 and 13 each assigned to its establishment processor. Signals directed to the regional processors are buffered in associated register columns 13 in the order in which they have been processed with the aid of the functional block for determining co-operation priority.

The co-operative system takes into account that jobs selected by signals directed to the central processors are conventionally arranged in priority levels. Every register column 12 assigned to a central processor therefore includes a plurality of subcolumns 14 assigned to each priority level. A function block 15, for determining priority of central processor jobs, stores tables with the aid of which signals directed to the central processors are addressed to the job buffer subcolumn 14 assigned to the appropriate priority level.

If several job buffer subcolumns associated with the same register column contain signals, the pertinent central processor is fed in principle from the subcolumn associated with the highest priority level in question. If the central processor has collected a first job with a first priority level, and if during processing of the instruction sequence associated with the first job a second job is buffered with a second priority level which is higher than the first priority level, the co-operative system sends an interruption signal to the central processor. The central processor then executes the instruction in progress included in the first job and afterwards collects the second job. The first job is executed completely when the first priority level once again becomes of immediate interest.

By terminating each instruction sequence with an instruction to call the independent co-operative signal switching system, there is obtained that the establishment process is controlled entirely without conventional inefficient jump instructions and associated address calculations stored in the establishment memories. During the time the co-operative system processes a call from an establishment processor, the latter has received a new co-operative signal from the appropriate job buffer register column and begins to execute it with the aid of the instruction sequence selected by the new signal.

Finally, the drawing illustrates a function block 16, for flexible control load distribution, which in a system with a plurality of central processors stores co-operative information concerning the above mentioned processor category assignation, existing processor redundancy and information as to what regional processors are controlled by what central processors. This multiprocessing information is varied in case of an establishment fault and in response to the immediate real time load of the establishment processors. Upon a fault in the establishment, the co-operative system is alarmed, which then stops all signals from and to faulty establishment processors and carries out a reconfiguration of the computer system. Such a rigorous reconfiguration due to faults results in disturbances in telephony traffic clearance and reduced processor redundancy in the continued control of the establishment process, but a well-sophisticated function block for flexible control load distribution decides the reconfiguration which as far as possible prevents total breakdown of the traffic in progress.

The multiprocessing organization established by the function block 16, for flexible control load distribution, is good if the job buffer block assigned to the central processors has approximately the same degree of occupation in its first in-first out shift register columns 12.

The degree of occupation of the register columns 13 in the job buffer block assigned to the regional processors should also be real time-supervised if the existing processor redundancy allows executing an establishment function with the aid of more than one regional processor. The function block for flexible control load distribution continuously checks the existing multiprocessing organization by calculating and registering the number of co-operative signals stored in the buffer register columns. An even better processor load control is obtained by continuously measuring the times during which each of the processors clears jobs obtained from the buffer registers. There is a risk of deteriorated control of the establishment process if one central processor operates for 90% of a given checking period, for example, while another central processor only operates for 30% of this period.

Upon such a risk of deteriorated control, determined by checking the degree of occupation of the job buffer block shift register columns, the function block for flexible control load distribution initiates a real time reorganization of job-assigning, on condition that the existing processor redundancy is sufficient for compensating the differencies in degree of occupation. A multiprocessing reorganization which does not disturb the traffic clearance process in progress is achieved in steps, for example, if new call signals are referred to the newly selected organization while co-operative signals being processed, including storage in the job-buffer blocks, are referred to the previous, no longer optimum organization.

If the computer system only includes one central processor or a plurality of processors without processor redundancy, the function block 16, for flexible control load distribution, supervises the degree of occupation in each of said job-buffer subcolumns 14. If it is found that the system is overloaded by jobs assigned to a single priority level, so that it does not have time to clear jobs with lower priority, calls coming into the signal switching system are blocked by the function block 16, when these signals result in central processor jobs within the overloaded priority level. Such call blocking deteriorates the control of the establishment process less than a central processor collapse due to overloading within one priority level.

What is claimed is:

1. Stored program controlled telecommunication establishment, the controlled and controlling parts of which comprise a plurality of establishment function blocks (2) which perform telephony functions and computer functions with the aid of instruction memory units and data memory units for storing establishment control information, and a plurality of processors which include at least one central processor (1), said function blocks and processors controlling in real time and in mutual co-operation the telephony traffic processed by the establishment with the aid of the stored control information, the co-operation functions containing determination of the consecutive order in which the establishment functions blocks perform their assigned functions, characterized by an independent stored program controlled signal switching means (3), for executing said co-operative functions by switching co-operative signals between said establishment parts, and which includes a co-operation memory means (7-16) for storing co-operative control and one (4) of the processors, which exclusively controls in real time the signal switching system with the aid of the stored co-operative control information.

2. Stored program controlled telecommunication establishment as claimed in claim 1, wherein said co-operation memory means includes
an instruction memory (8) for storing co-operation instructions,
first co-operation function blocks (9,10) for consecutively receiving and intermediately storing incoming co-operative signals,
a first priority determining function block (11) which determines the consecutive order in which the signals stored intermediately in the first co-operation function block are switched,
a second priority determining function block (15) which contains priority tables for associating priority levels with co-operative signals addressed to central processors,
a second co-operation function block for buffering co-operative signals addressed to central processors, said signals being written into first in-first out shift registers (14) arranged in groups (12), a shift register address being determined by a group address assigned to the central processor in question and by the priority level in question which said second priority determining function block has assigned to the signal in question, a central processor being fed from its shift register group with the buffered signal which has the highest priority level for the moment, a central processor obtaining an interruption signal due to a signal buffered in one of the shift registers of its group, the priority level of this signal being higher than the one associated with the signal at this instant being processed by the central processor, and
a third co-operation function block for buffering co-operative signals addressed to the establishment function blocks, the signals being buffered in first in-first out shift registers (13) each assigned to its establishment function block.

3. Stored program controlled telecommunication establishment as claimed in claim 2, wherein the establishment includes at least two central processors (1) and the co-operative signal switching system (3) includes a function block (16), for flexible control load distribution, which contains the prevailing load distribution information as to which central processor (1) controls which establishment function blocks (2) and immediate information as to the occupation in the shift register groups (12) of the second co-operation functional block, and which performs a reconfiguration of the processor load distribution if a difference of an instant occupation degree results in deteriorated control of the telecommunication establishment.

4. Stored program controlled telecommunication establishment as claimed in claim 3, wherein said function block (16), for flexible control load distribution, contains up-to-date information on occupation in each of said group-wise arranged shift registers (14), and blocks the buffering of co-operative signals in a shift register of the second co-operation function block if the associated central processor (1) is overloaded with signals coming from this shift register.

5. Stored program controlled telecommunication establishment as claimed in claim 3, wherein said function block for flexible control load distribution includes counters for counting the prevailing number of co-operative signals buffered in the shift registers of the second co-operation function block, and includes a comparator circuit for mutually comparing the counter results and regulating the prevailing central processor load.

6. Stored program controlled telecommunication establishment as claimed in claim 3, wherein said function block for flexible control load distribution includes time meters for measuring prevailing time periods during p which the central processors are loaded due to co-operative signals buffered in the shift registers of the second co-operation function block, and includes a comparator circuit for mutually comparing the time measurement results and regulating the prevailing central processor loading.

* * * * *